US012430581B2

(12) United States Patent
Sabat et al.

(10) Patent No.: US 12,430,581 B2
(45) Date of Patent: Sep. 30, 2025

(54) MACHINE LEARNING TRAINING DEVICE

(71) Applicant: Bank of America Corporation, Charlotte, NC (US)

(72) Inventors: Lingaraj Sabat, Hyderabad (IN); Madhusudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 1040 days.

(21) Appl. No.: 17/176,034

(22) Filed: Feb. 15, 2021

(65) Prior Publication Data

US 2022/0261685 A1    Aug. 18, 2022

(51) Int. Cl.
G06N 20/00    (2019.01)
G06F 18/21    (2023.01)
G06F 18/211   (2023.01)
G06F 18/23    (2023.01)
G06F 18/25    (2023.01)
G06V 10/75    (2022.01)

(52) U.S. Cl.
CPC .......... G06N 20/00 (2019.01); G06F 18/211 (2023.01); G06F 18/217 (2023.01); G06F 18/23 (2023.01); G06F 18/25 (2023.01); G06V 10/751 (2022.01)

(58) Field of Classification Search
CPC ..................................................... G06N 20/00
See application file for complete search history.

(56) References Cited

U.S. PATENT DOCUMENTS

| | | | |
|---|---|---|---|
| 8,296,247 B2 | 10/2012 | Zhang et al. | |
| 8,965,822 B2 | 2/2015 | Frank et al. | |
| 9,704,054 B1 | 7/2017 | Tappen et al. | |
| 9,805,462 B2 | 10/2017 | Sezginer et al. | |
| 10,192,323 B2 | 1/2019 | Babenko et al. | |
| 10,373,056 B1 | 8/2019 | Andoni et al. | |
| 10,546,393 B2 | 1/2020 | Ray et al. | |
| 10,678,816 B2 | 6/2020 | Peng et al. | |
| 10,845,463 B2 | 11/2020 | Zhang et al. | |
| 11,804,050 B1* | 10/2023 | Milletari | G06V 20/64 |
| 2012/0239797 A1* | 9/2012 | Agrawal | H04L 41/145 |
| | | | 709/224 |
| 2016/0260023 A1 | 9/2016 | Miserendino, Jr. et al. | |
| 2017/0220949 A1 | 8/2017 | Feng et al. | |
| 2018/0114101 A1 | 4/2018 | Desai et al. | |

(Continued)

OTHER PUBLICATIONS

Zhu et al., "Evaluation of Approaches for Power Estimation in a Computing Cluster," International Green Computing Conference, Dallas, TX, USA, 2014, pp. 1-10, doi: 10.1109/IGCC.2014.7039145. (Year: 2015).*

(Continued)

*Primary Examiner* — Kamran Afshar
*Assistant Examiner* — Steven Phung
(74) *Attorney, Agent, or Firm* — Banner & Witcoff, Ltd.

(57) ABSTRACT

A machine learning training device having a clustering device configured to group machine learning training requests into a consolidated training block. The clustering device includes an isomorphism engine and an energy estimator configured to construct the consolidated training block based upon an amount of energy that will be saved by training the machine learning training requests together, thereby reducing an overall energy consumption by machine learning processes.

18 Claims, 6 Drawing Sheets

(56) References Cited

U.S. PATENT DOCUMENTS

| | | | |
|---|---|---|---|
| 2018/0322386 A1 | 11/2018 | Sridharan et al. | |
| 2019/0205745 A1 | 7/2019 | Sridharan et al. | |
| 2019/0370684 A1* | 12/2019 | Gunes | G06N 20/00 |
| 2020/0027002 A1 | 1/2020 | Hickson et al. | |
| 2020/0081865 A1 | 3/2020 | Farrar et al. | |
| 2020/0082300 A1 | 3/2020 | Farrar et al. | |
| 2020/0090045 A1 | 3/2020 | Baker | |
| 2020/0191943 A1 | 6/2020 | Wu et al. | |
| 2020/0193221 A1* | 6/2020 | Aftab | G06N 3/08 |
| 2020/0272905 A1* | 8/2020 | Saripalli | G06N 3/082 |
| 2020/0320371 A1 | 10/2020 | Baker | |
| 2020/0372365 A1 | 11/2020 | Cecil | |
| 2020/0387836 A1* | 12/2020 | Nasr-Azadani | G06N 20/20 |
| 2021/0027195 A1* | 1/2021 | Alakuijala | G06N 20/00 |
| 2021/0271963 A1* | 9/2021 | Amisano | G06N 3/08 |
| 2022/0207643 A1* | 6/2022 | Puthoor | G06F 9/545 |

OTHER PUBLICATIONS

Lacoste et al., "Quantifying the Carbon Emissions of Machine Learning," arXiv preprint arXiv:1910.09700, 2019, pp. 1-8. (Year: 2019).*

* cited by examiner

| Training Request 200 | | | | | |
|---|---|---|---|---|---|
| Data Location 202 | Data Type 204 | Training Type 206 | Architecture 208 | Service level 210 | Priority 212 |

FIG. 2A

| Consolidated Training Block 250 | | | | | |
|---|---|---|---|---|---|
| Included Requests 252 | Data Location 254 | Training Type 256 | Iterations 258 | Service level 260 | Priority 262 |

MACHINE LEARNING TRAINING DEVICE

TECHNICAL FIELD

Aspects of this disclosure generally relate to processes in preparation for and for execution of machine learning. This disclosure includes a device that can be used to cluster machine learning requests in order to decrease the energy consumption and the carbon footprint of machine learning processes.

BACKGROUND

Machine learning involves the training of mathematical models, and this training may be very resource intensive. Further, in some organizations, engineers are performing redundant training of similar models. As the amount of machine learning projects untaken increases year on year, this redundant training represents an ever-increasing source of wasted energy. Further, no device exists that addresses this energy inefficiency and can be used to identify similar machine learning training requests.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure includes a machine learning training device that has a queuing device configured to receive multiple machine learning training requests. The machine learning training device may also include a clustering device that is configured to consolidate two or more machine learning training requests selected from the multiple machine learning training requests received by the queuing device. This grouping/consolidation by the clustering device forms a consolidated training block. The clustering device may also include an isomorphism engine that is configured to execute a comparison process on the two or more machine learning training requests selected from the multiple training requests received by the queuing device. The clustering device may also include an energy estimator that is configured to calculate an estimate of an amount of energy saved by clustering the two or more machine learning training requests into the consolidated training block, rather than training the training requests separately. The machine learning training device may also include a training engine that is configured to execute one or more machine learning processes or algorithms on the consolidated training block. The training engine may further calculate and output a set of shared model weights that are configured to be shared between the two or more machine learning training requests of the consolidated training block in order to predict the targets of the machine learning tasks. The machine learning training device may also include a notification engine that is configured to output a status of the training of the consolidated training block.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

FIG. 2A schematically depicts a data structure of a training request according to one or more aspects described herein;

FIG. 2B schematically depicts a data structure of a consolidated training block, according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
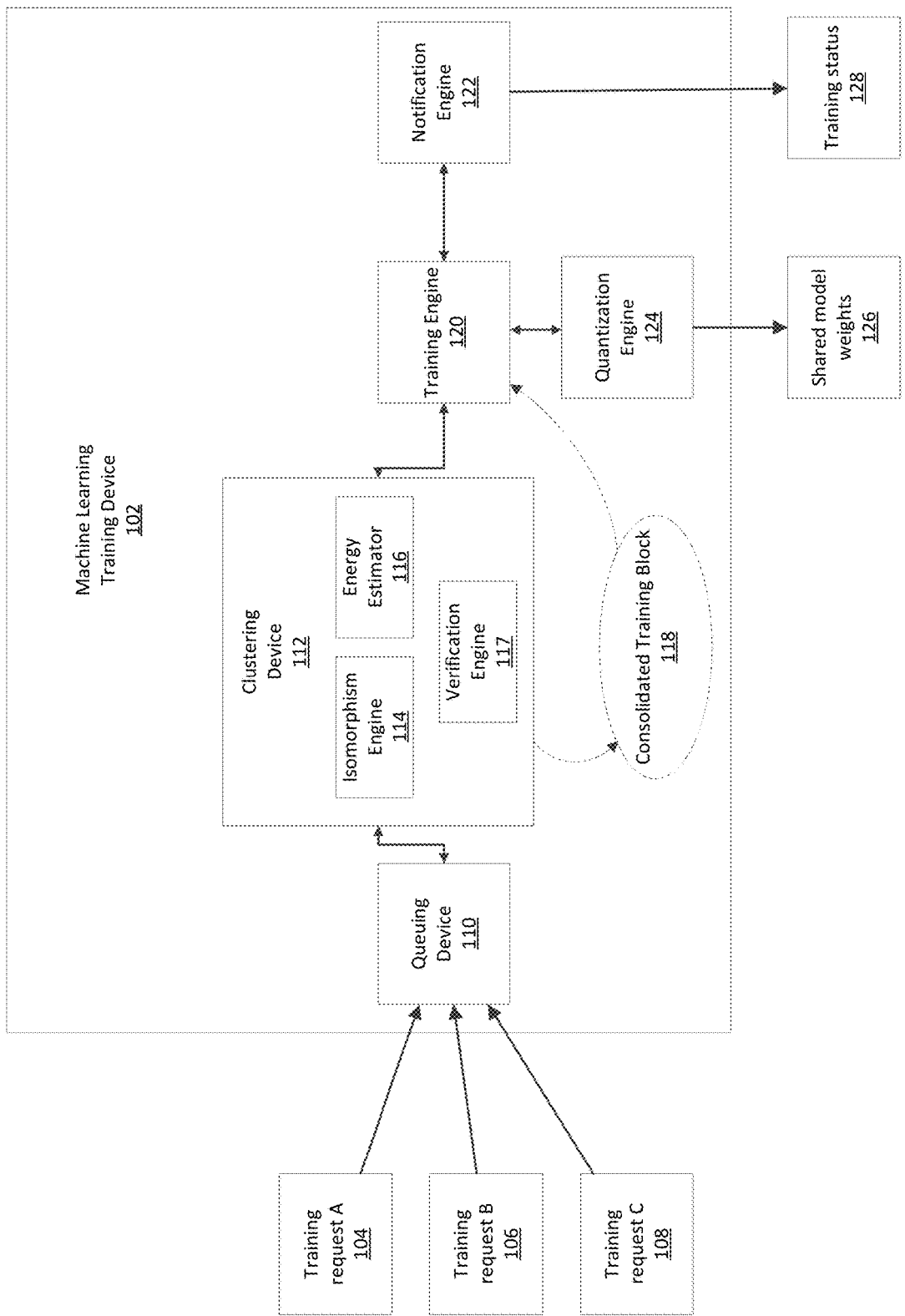
FIG. 1 schematically depicts a machine learning training device, according to one or more aspects described herein.

FIG. 1 schematically depicts a machine learning training device 102 according to one or more aspects described herein. It is contemplated that the machine learning training device 102 may be implemented as one or more hardware elements that include one or more application-specific integrated circuits. In other examples, the machine learning training device 102 may additionally or alternatively include software and/or firmware elements in order to implement the functionality described herein. Further examples of implementations of the machine learning training device 102 are presented in proceeding sections of this disclosure. It is further contemplated that the machine learning training device 102 may be used for any machine learning and/or deep learning processes that utilize supervised or unsupervised learning. As such, machine learning and deep learning may be used interchangeably in the description that follows.

The machine learning training device 102 may be configured to aggregate machine learning training requests, and to identify requests that can be combined together in order to reduce a total amount of energy needed to fulfilled the training requests. The machine learning training device 102 may calculate an amount of energy saved by combining machine learning training requests, which may be expressed as an amount of carbon dioxide (CO2) that may be saved as a result of the combination of machine learning training requests.

In one example, the machine learning training device 102 is configured to receive training requests from one or more sources. These sources may be one or more machine learning engineers or scientists, or automated systems within or external to an organization. As schematically depicted in FIG. 1, the machine learning training device 102 receives training request A 104, training request B 106, and training request C 108. These training requests 104-108 are representative of what may be a large number of training requests received by the machine learning training device 102. In one example, the machine learning training device 102 may be implemented as hardware, firmware, and/or software that is connected in between a machine learning framework and a parallel computing platform and/or application programming interface (API) that allows for machine learning to be executed on one or more graphics processing units (GPUs). It is contemplated that the machine learning training device 102 may be operable with a large variety of machine learning frameworks or platforms. Similarly, it is contemplated that the machine learning training device 102 may be operable with any parallel computing platforms and interfaces configured to interface with an array of graphics processing units for machine learning. Accordingly, the training requests 104-108 may be received from one or more different machine learning frameworks, or a same framework. More specific details on the structure of a training request, such as training requests 104-108, are discussed in relation to FIG. 2.

The training requests 104-108 may be received by a queuing device 110. The queuing device 110 may be configured to store the training requests 104-108 such that they may be accessed by a clustering device 112. It is contemplated that the queuing device 110 may utilize any queuing methodology known to those of ordinary skill in the art. In one example, the queuing device 110 may utilize a first-in first-out (FIFO) queuing system, such that older training requests held within one or more queues of the queuing device 110 are given a higher priority for training. However, the prioritization assigned by the queuing device 110 may be modified based upon a prioritization level associated with a training request that may result in a more recently receive training request being implemented before an older training request. Further, the prioritization may be augmented in order to facilitate clustering of similar and compatible training requests, as described in further detail in relation to clustering device 112.

Clustering device 112 may be utilized to identify training requests stored within the queuing device 110 that are suitable for grouping together to train as a single machine learning training process. As such, the clustering device 112 is configured to reduce an amount of energy needed to train the training requests received by the queuing device 110. In one example, the clustering device 112 includes an isomorphism engine 114. This isomorphism engine 114 may be configured to compare two or more training requests within the queuing device 110. Specifically, the isomorphism engine 114 may utilize a subgraph isomorphism algorithm in order to compare training requests with multiple attributes of different formats. In particular, while a training request may have a data structure similar to that described in relation to FIG. 2, the different attributes 202-212 may be stored in different formats between different training requests. The isomorphism engine 114 and the subgraph isomorphism algorithm executed by the isomorphism engine 114 may be utilized to compare these different formats to one another in order to identify training requests that may be grouped together into a consolidated training block 118.

In one example, a comparison algorithm executed by isomorphism engine 114 may output a compatibility score. This compatibility score may be a binary result that indicates that two or more training requests compared by the isomorphism engine 114 are compatible or incompatible with one another for clustering into a consolidated training block 118. In another example, compatibility score output of the isomorphism engine 114 may score a compatibility of two or more training requests on a scale of compatibility with one another. It is contemplated that the scale may have any range, such as a range of 0 to 10. In one example, training requests with compatibility scores above a threshold value, or combinations of training requests with a combined (average, weighted average, among others) compatibility score above a threshold value may be combined into a consolidated training block 118.

The clustering device 112 may additionally include an energy estimator 116. In one example, the energy estimator 116 may analyze the same training requests compared using the isomorphism engine 114. The energy estimator 116 may be configured to estimate an amount of energy needed to perform the requested machine learning training. Further, the energy estimator 116 may estimate an amount of energy needed to complete the requested machine learning training when the two or more requests are grouped together into a consolidated training block 118. In one example, the energy estimator 116 may calculate estimates of an amount of energy needed to perform the requested machine learning training based upon information received within a training request, such as the data location, data type, and training type. The information received within a training request may implicitly or explicitly indicate a number of iterations that may be used to complete the model training. Additionally or alternatively, the energy estimator 116 may estimate an amount of energy that may be needed to complete a machine learning training request based upon previously completed and similar training requests. Further, the energy estimator 116 may execute one or more processes to estimate an amount of energy that a combined training request, otherwise referred to as a consolidated training block 118, may use during one or more machine learning training processes. This energy estimation associated with the consolidated training block 118 may be based upon a degree to which the training requests within the consolidated training block 118 are alike, as identified by the isomorphism engine 114. As such, the energy estimator 116 may utilize an estimate of the degree of overlap between two or more training requests, and received information on the type and extent of training to be executed in fulfillment of each of the training requests if they were to be trained separately. Additionally or alternatively, the energy estimator 116 may estimate an amount of energy for the consolidated training block 118 based upon previously completed consolidated training.

In one example, the energy estimator 116 may calculate and/or retrieve an estimate of carbon dioxide used and/or saved by consolidating two or more training requests into the consolidated training block 118. Further, the estimated energy savings calculated and/or retrieved by the energy estimator 116 may be used to determine whether the consolidated training block 118 should be constructed and trained using the training engine 120. In one example, an energy saving value below a threshold value that is associated with a proposed consolidated training block 118 may not proceed to training using the training engine 120. In other words, the energy estimator 116 may be used to evaluate consolidated training block permutations constructed by the clustering device 112, and only authorize training on those consolidated training blocks that save a threshold amount of energy when compared to the training requests implemented separately. In this regard, it is contemplated that any energy threshold amount may be utilized.

In one example, the clustering device 112 of the machine learning training device 102 may additionally include a verification engine 117. Accordingly, the verification engine 117 may be configured to execute an algorithm to analyze a proposed consolidated training block constructed by the clustering device and determine if the proposed consolidated training block represents a good option for progression onto training using the training engine 120. The verification engine 117 may analyze the proposed consolidated training block based upon the outputs of the isomorphism engine 114 and the energy estimator 116. In one example, the verification engine 117 may assess the degree to which two or more training requests proposed to be consolidated into a consolidated training block are compatible or similar to one another. Further, the verification engine 117 may assess an amount of energy that may be saved by consolidating the training requests into the proposed consolidated training block. It is contemplated that different threshold levels for the degree of similarity/compatibility, and the amount of energy saved may be used by the verification engine. In one example, the threshold levels for compatibility/similarity of training requests and energy saved may be variable, based upon the value of one factor versus the other. In another example, the thresholds for compatibility and energy saved may be fixed thresholds. It is contemplated that any values for these thresholds may be utilized, without departing from the scope of these disclosures. In one implementation, an analysis algorithm executed by the verification engine 117 may be supplementary to threshold criteria applied by one or more of the isomorphism engine 114 and the energy estimator 116. In another example, the verification engine 117 may be utilized by one or more of the isomorphism engine 114 and the energy estimator 116 to apply verification processes to other processes being executed by elements 114 and 116. In this way, the verification engine 117 may be utilized as a threshold setting algorithm for one or more of engine 114 and estimator 116. In one example, feedback from the verification engine 117 may be utilized by the clustering device 112 to iteratively improve upon proposed consolidated training block combinations of training requests (e.g. training requests 104-108. It is contemplated that any iterative algorithms may be utilized by the verification engine 117 in this regard. In one example, the verification engine 117 is configured to output a validation score to the clustering device 112, such that the validation score is representative of an effectiveness of the consolidated training block construction, and incorporating the degree to which the training requests are compatible with one another, and an amount of energy that will be saved by training those training requests together in the consolidated training block. This validation score generated by the verification engine 117 may be used to iteratively improve a consolidation of two or more machine learning training requests into the proposed consolidated training block. For example, the clustering device 112 may only approve and output a consolidated training block with a validation score above a threshold value.

The machine learning training device 102 may also include a training engine 120. It is contemplated that this training engine 120 may utilize any machine learning training processes. In one example, the training engine 120 may represent one or more elements of a parallel computing platform and API, as previously described. Specifically, the consolidated training block 118 may be passed to the training engine 120, and the training engine 120 may be utilized to distribute the training across one or more GPUs. Accordingly, the training engine 120 may be in communication with external hardware, such as an array of GPUs, that are co-located or remotely located from the machine learning training device 102.

Upon calculation of a target model, the training engine 120 may output calculated model weights to the quantization engine 124. Accordingly, the quantization engine 124 may be utilized to reduce an amount of storage space required to store those calculated model weights. In one example, the quantization engine 124 may execute one or more discrete quantization algorithms. Specifically, the model weights may be converted from 32-bit floating-point data types to 16-bit floating-point data types. These converted model weights may be outputted to one or more users of the machine learning training device 102 as shared model weights 126. Accordingly, the shared model weights 126 may be shared between multiple target models that fulfill the two or more training requests that were consolidated into the consolidated training block 118.

The training engine 120 may also output status information to the notification engine 122. Accordingly, the notification engine 122 may be utilized to communicate to a user of the machine learning training device 102 a status of the training processes being executed by the training engine 120. This status information may include a time elapsed, an estimated time remaining, a percentage of total iterations complete, among others. This status information may be outputted to a user as training status 128.

In one example, a framework for machine learning implemented by the training engine 120 may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned by to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals clearer, given the nearly infinite number of variables that can possible be optimized in the machine learning system.

In some embodiments, one or more of the processes executed by the training engine 120 may use a system of machine learning and/or artificial intelligence to improve accuracy of the determinations made by said device 120. As explained herein, a framework for machine learning may involve a combination of supervised and unsupervised learning models.

FIG. 2A schematically depicts a data structure of a training request 200, according to one or more aspects described herein. The training request 200 may be received from a machine learning framework, as discussed in relation to FIG. 1. The training request 200 may be similar to the training requests 104-108 schematically depicted in FIG. 1. It is contemplated that the training request 200 may utilize any data structure type, or combination of data structures, to store the information associated with a training request 200. In one example, the training request 200 includes a data location 202. This data location 202 may contain information about where training data is stored. Further, the data location 202 may include file names and addresses within one or more co-located and/or cloud-based databases. The training request 200 may additionally include a data type 204. This data type 204 may categorize machine learning training based upon the type of training data used to build the machine learning model. Accordingly, the data type 204 may identify the training data as image, text, or tabular data, among others. The training request 200 includes information on the requested training type 206. The training type 206 may identify the requested machine learning training as object detection, segmentation, classification, among others. Architecture 208 may store information on the machine learning framework used to request the machine learning training. In some instances, training requests received from different architectures may not be suitable for clustering together into a consolidated training block 118. Accordingly, it is contemplated that the architecture 208 data may include any relevant computer architecture information, including a language type and, a version, among many others. Service level 210 may be used to store an identification of a time and/or date for which the training request 200 is to be completed. The priority 212 may be utilized to store a prioritization level of the request 200. This prioritization level may be assigned by the machine learning training device 102, or may be received from the sender of the request 200. It is contemplated that any number of prioritization levels may be utilized, without departing from the scope of these disclosures.

FIG. 2B schematically depicts a data structure of a consolidated training block 250, according to one or more aspects described herein. The consolidated training block 250 may be similar to consolidated training block 118, as discussed in relation to FIG. 1. It is contemplated that the consolidated training block 250 may utilize any data structure type, or combination of data structures to store the information associated with the consolidated training block 250. In one example, the consolidated training block 250 includes a list of training requests that have been grouped together within the consolidated training block 250. This list is schematically depicted as included requests 252. In addition, the consolidated training block 250 may include data location 254. This data location 254 may include storage location information about the training data that is to be used to train the grouped training requests. Training type 256 may store information about the machine learning type to be implemented on the included request 252, and iterations 258 may store the extent of the machine learning to be carried out on the consolidated training block 250. Service level 260 may store a date before which the consolidated training block 250 is to be trained, and priority 262 may store a prioritization level associated with the consolidated training block 250 that may be used to schedule different training blocks relative to one another.

In one example, a consolidated training block 250 may have a dynamic structure to which additional training requests can be added. In another example, the consolidate training block 250 may have a static structure of a fixed size once two or more training requests, such as requests 200, are selected for consolidation. The consolidated training block 250 may, in certain examples, include pointers to locations in memory where received training requests 200 are stored, and such that the data fields of the consolidated training block 250 are not duplicating information of the training requests 200.

Figure 3:
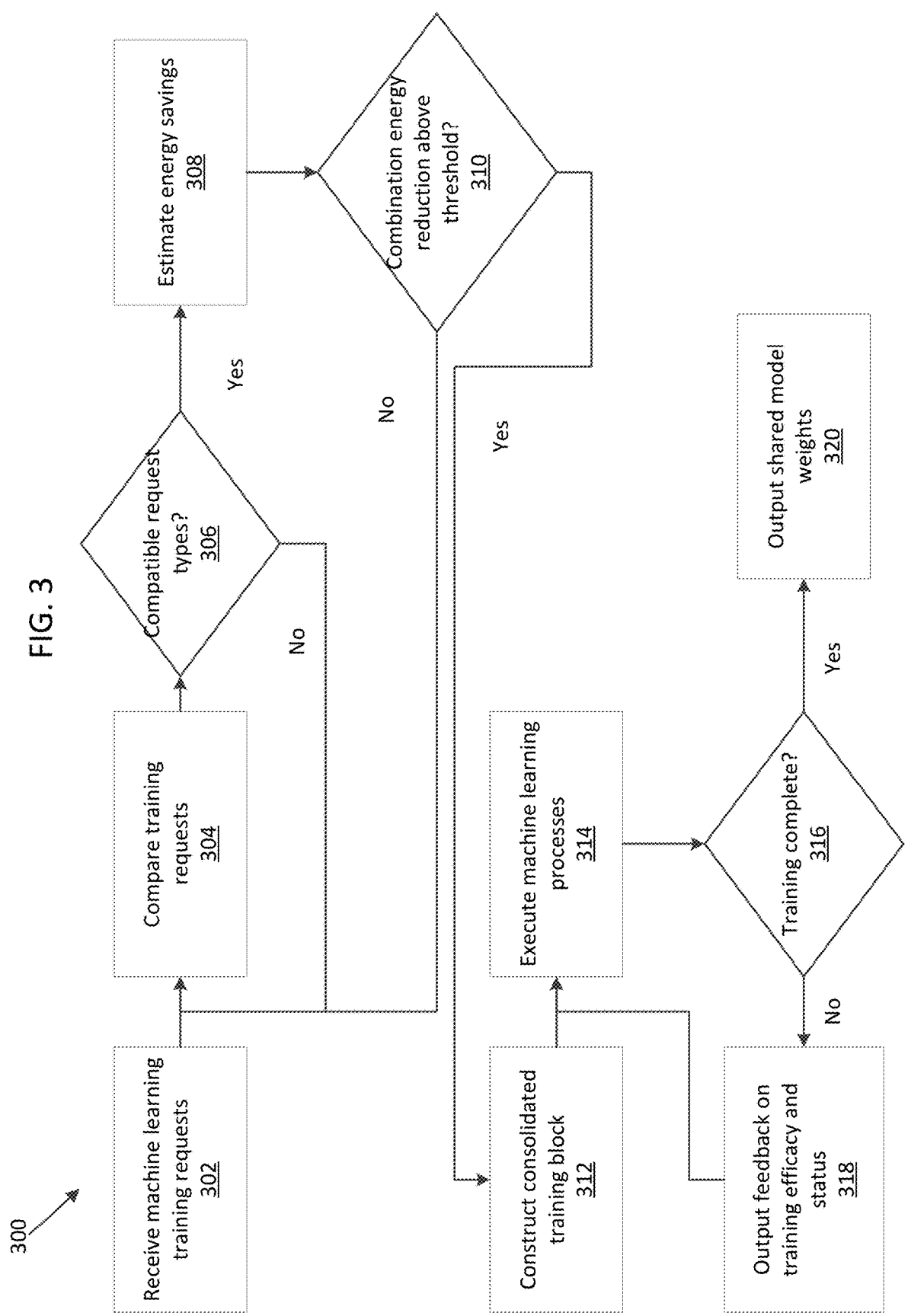
FIG. 3 is a flowchart diagram of a process for calculating shared model weights using a consolidated training block of machine learning training requests, according to one or more aspects described herein.

FIG. 3 is a flowchart diagram 300 of a process for calculating shared model weights using a consolidated training block of machine learning training requests, according to one or more aspects described herein. Accordingly, flowchart diagram 300 may be executed by a machine learning training device, such as machine learning training device 102 described in relation to FIG. 1. In one example, one or more processes may be executed at block 302 to receive machine learning training requests, similar to training requests 104-108. Accordingly, the training requests may be received by a queuing device, such as queuing device 110. Block 304 represents one or more processes that may be executed to compare training requests received at block 302. The comparison carried out at block 304 may be executed by clustering device 112. Specifically, one or more processes may be executed at block 304 by the isomorphism engine 114 to compare training requests received into the queuing device 110. Decision block 306 executes one or more processes to determine whether the compared training requests are compatible and may be grouped together into a consolidated training block 118. As previously discussed, a compatibility decision may be based upon a compatibility score, or may be a binary decision. If the clustering device 112 determines that the training requests are not suitable for grouping into a consolidated training block 118, flowchart 300 proceeds back to block 304, and the clustering device 112 selects a different combination of training requests to be compared to one another. It is contemplated that any grouping algorithm may be utilized to iterate through different permutations of grouping types of the training requests received by the queuing device 110. If the clustering device 112 determines that the compared training requests are suitable for grouping into a consolidated training block 118, flowchart 300 proceeds to block 308. Block 308 may represent one or more processes executed by the energy estimator 116 to estimate an amount of energy used and/or an amount of energy saved by grouping the compatible training requests into the consolidated training block 118 in order to train one or more machine learning models. Decision block 310 represents one or more processes executed by the clustering device 112 to determine whether the energy savings are significant enough to proceed with the training of the consolidated training block 118. If it is determined that the energy reduction is not above a threshold value, flowchart 300 proceeds back to block 304. Further, it is noted that any threshold values may be used, without departing from the scope of these disclosures. If, however, the estimated energy savings associated with training the consolidated training block 118 are above a threshold value, flowchart 300 proceeds to block 312. Block 312 represents one or more processes executed by the clustering device 112 to construct the consolidated training block 118. In one example, the one or more processes of block 312 may identify a suitable training data set that fulfills all of the grouped training requests of the consolidated training block 118. The consolidated training block 118 may be communicated to a machine learning training engine at block 314 of flowchart 300. In one example, the one or more processes executed at block 314 may be executed by training engine 120 from FIG. 1.

Decision block 316 may execute one or more processes to determine whether the machine learning processes have completed the requests of the consolidated training block. In one example, a user of the machine learning training device 102 may submit a request for status information on progress of machine learning training being carried out. In another example, the machine learning training device 102 may automatically output status updates. The one or more processes executed at decision block 316 may be executed by the notification engine 122. Accordingly, if the training has not been completed, flowchart 300 may proceed to block 318, and the notification engine 122 may execute one or more processes to output feedback on how much progress has been made in the training. Upon completion of the machine learning training, flowchart 300 may proceed from decision block 316 to block 320 whereby one or more processes may be executed by the quantization engine 124 on the notification engine 122 to output shared model weights and an indication that the training has been completed.

Figure 4:
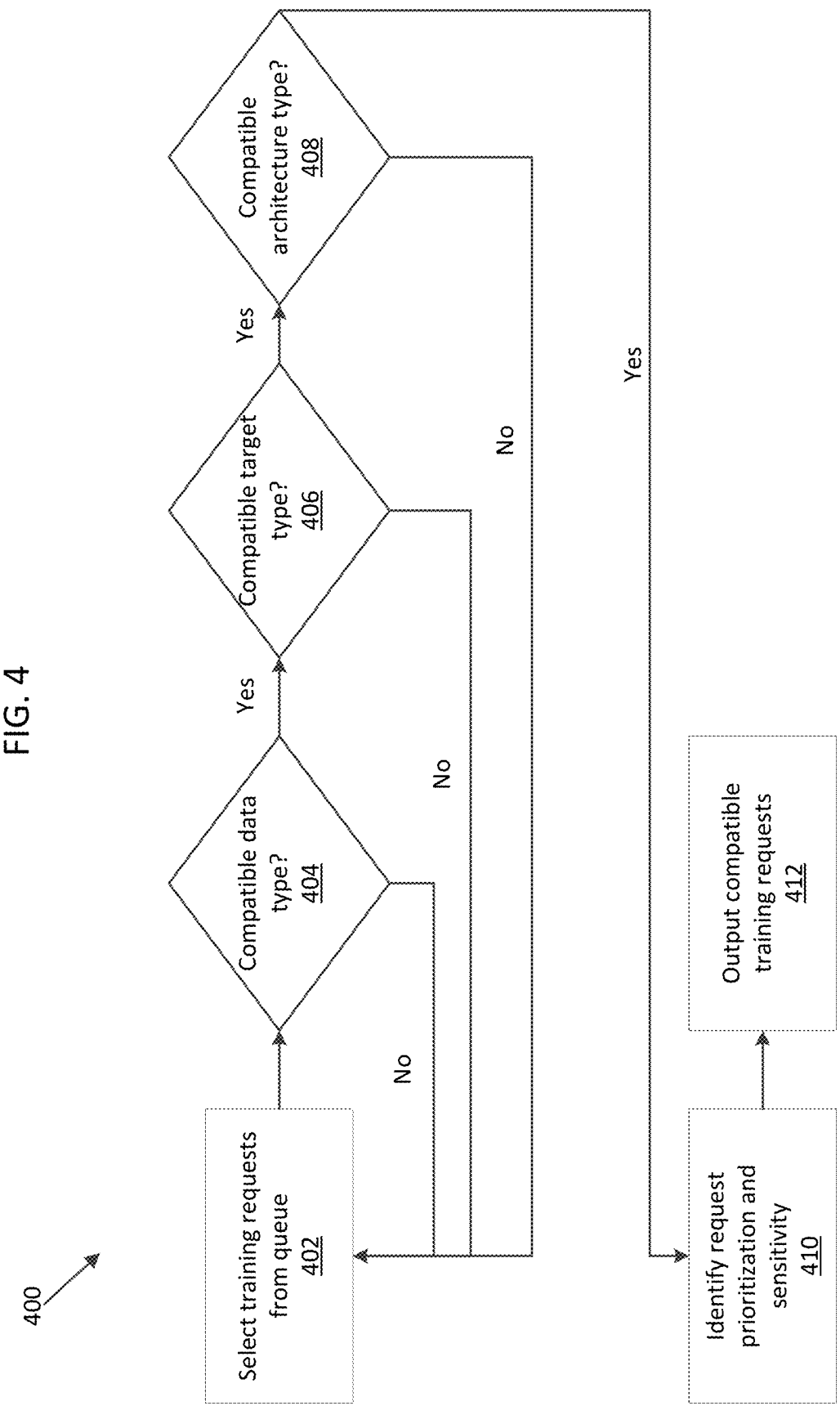
FIG. 4 is a flowchart diagram of a process for identifying compatible training requests suitable for consolidation into a consolidated training block, according to one or more aspects described herein.

FIG. 4 is a flowchart diagram 400 of a process for identifying compatible training requests suitable for consolidation into a consolidated training block, according to one or more aspects described herein. In one example, flowchart 400 expands upon block 304 of flowchart 300 and may be executed by the clustering device 112. In one example, one or more processes may be executed at block 402 to select training requests from the queue of queuing device 110. Decision block 404 represents one or more processes to analyze the data type of the selected training requests. As previously described, a data type may be image, text, or tabular data, among others. If the selected training requests have compatible data types, flowchart 400 may proceed to decision block 406. At block 406, one or more processes may be executed by the clustering device 112 to determine if the selected training requests have compatible target types. As previously described, the target types may be the intended output from the machine learning model, and may include object detection, segmentation, classification, among others. If the selected training requests have compatible target types, flowchart 400 may proceed to decision block 408. At decision block 408, one or more processes may be executed by the clustering device 112 to determine whether the selected training requests have compatible architecture types. In one example, the training requests may be requested using different languages and computer architecture hardware, firmware, and/or software. It is contemplated that those of ordinary skill in the art will recognize that certain computer architectures will exhibit interoperability issues, and may be incompatible with one another. If the selected training requests are identified as having compatible architecture types, flowchart 400 may proceed to block 410. At block 410, one or more processes may be executed by the clustering device 112 to identify prioritization and sensitivity levels associated with the selected training requests. In one example, a prioritization may be a ranked level of importance of the training request. A consolidated training block may be assigned a prioritization equal to the highest prioritization of one of the constituent training requests. A sensitivity of the selected training requests may describe a security level with which the data associated the machine learning training is to be executed is to be stored. Upon identification of prioritization and sensitivity at block 410, flowchart 400 may proceed to block 412. At block 412, one or more processes may be executed to output compatible training requests that may be used to construct a consolidated training block, such as block 118. In one example, the processes executed within flowchart 400 may be executed by the isomorphism engine 114.

Figure 5:
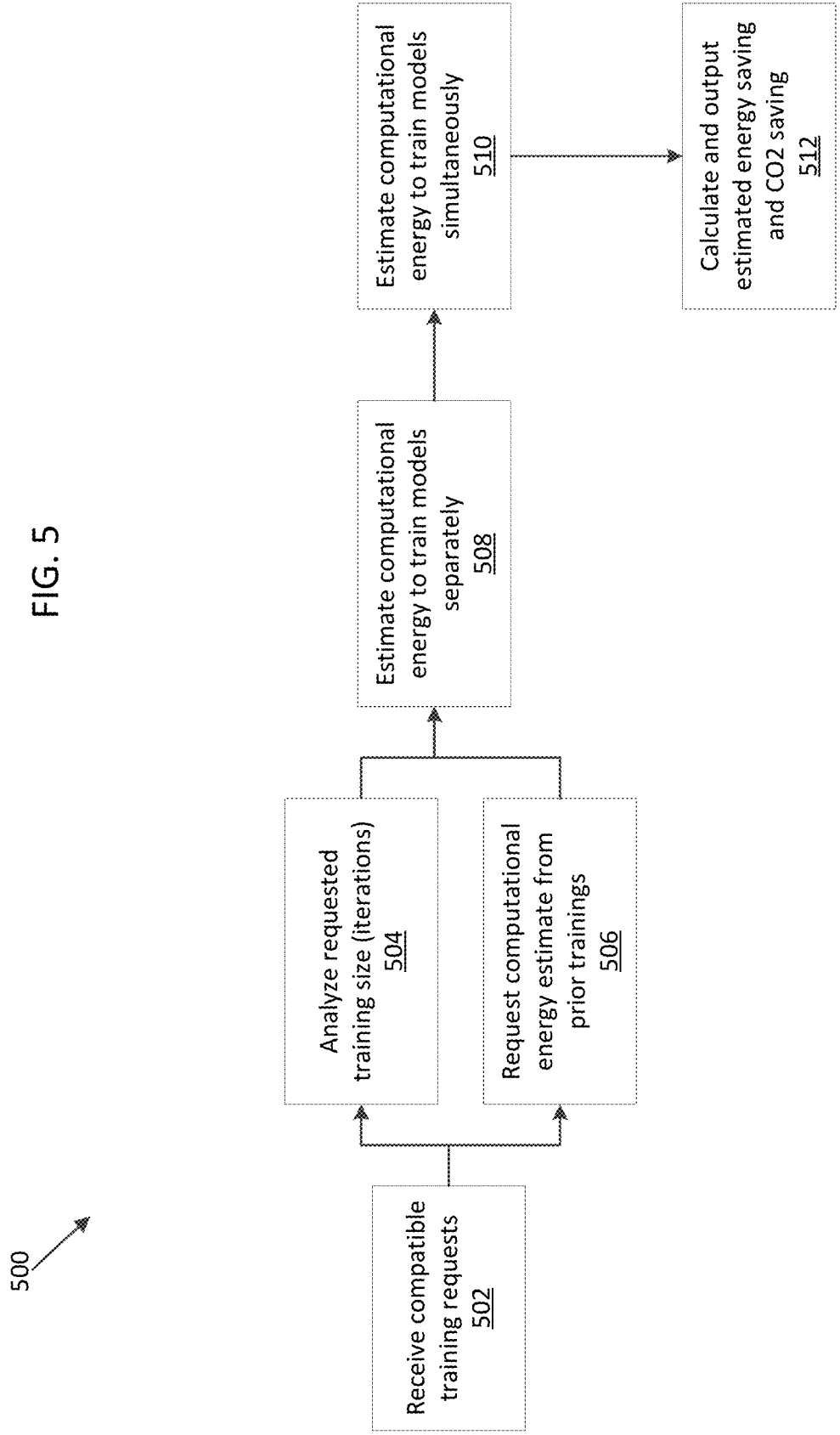
FIG. 5 is a flowchart diagram of a process for calculating estimated energy and $CO_2$ emissions savings associated with a consolidated training block, according to one or more aspects described herein.

FIG. 5 is a flowchart diagram 500 of a process for calculating estimated energy and CO2 emissions savings associated with a consolidated training block, according to one or more aspects described herein. In the preceding and proceeding description, energy may be considered a proxy for computational complexity and/or computational iterations that should be carried out in order to train one or more machine learning models. Additionally or alternatively, an energy estimate may be a true energy value, in Joules, and/or a measure of electrical power, in Watts, among others. In one example, the flowchart 500 may be executed by the energy estimator 116. Block 502 may execute one or more processes to receive compatible training requests. The data received at block 502 may be the output from flowchart 400, following the analysis of training requests received by the queuing device 110. In one example, flowchart 500 may proceed to block 504 and analyze the requested size of the training to be performed on the compatible training requests. The analysis at block 504 may identify an anticipated training size based upon information stored within the training requests. In one example, the one or more processes executed at block 504 may analyze the number of iterations associated with a machine learning training request. Additionally or alternatively, flowchart 500 may proceed from block 502 to block 506. At block 506, one or more processes may be executed to request one or more computational energy estimates from prior trainings executed by the training engine 120, with the prior trainings having similar characteristics to the received training requests received at block 502. Upon completion of the processes at block 504 and/or block 506, flowchart 500 may proceed to block 508. At block 508, the information gathered at block 504 and/or 506 may be consolidated to estimate the energy that would be used to separately train the models associated with the compatible training requests. Further, flowchart 500 may proceed to block 510 and execute one or more processes to estimate the energy that would be used to simultaneously train the models received at block 502. In one example, the one or more processes executed at block 510 may estimate the simultaneous training energy requirements based upon a degree of similarity between the compatible training requests, and/or a degree of similarity between the compatible training requests and previously consolidated training executed by the training engine 120. Upon estimation of the energy used to simultaneously train the received training requests, flowchart 500 may proceed to block 512. At block 512, one or more processes may be executed to calculate and output estimated energy and CO2 savings that would be achieved by training the training requests simultaneously.

In certain examples, the energy estimation of block 510 may utilize a lookup table of energy usage values per unit of computation. This unit of computation may be measured in FLOPs, of Hz, among others. The energy usage may be stored based upon the power consumption of an underlying array of graphics processing units which are to carry out the machine learning operations. This energy usage per unit of computation may be stored based upon observed data from past machine learning operations, from manufacturer-provided data on the energy usage of the graphics processing units, or a combination thereof.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of FIG. 1 may be implemented as standalone hardware elements embodied as application-specific integrated circuits or similar hardware elements. In another example, two or more of the elements of FIG. 1 may be combined together and implemented as dedicated hardware elements. In yet another example, one or more elements of FIG. 1 may be implemented as firmware and/or software modules. Further, one or more of the elements of FIG. 1 may be embodied using a general-purpose or specialized computing system, such as computing system 600 from FIG. 6.

Figure 6:
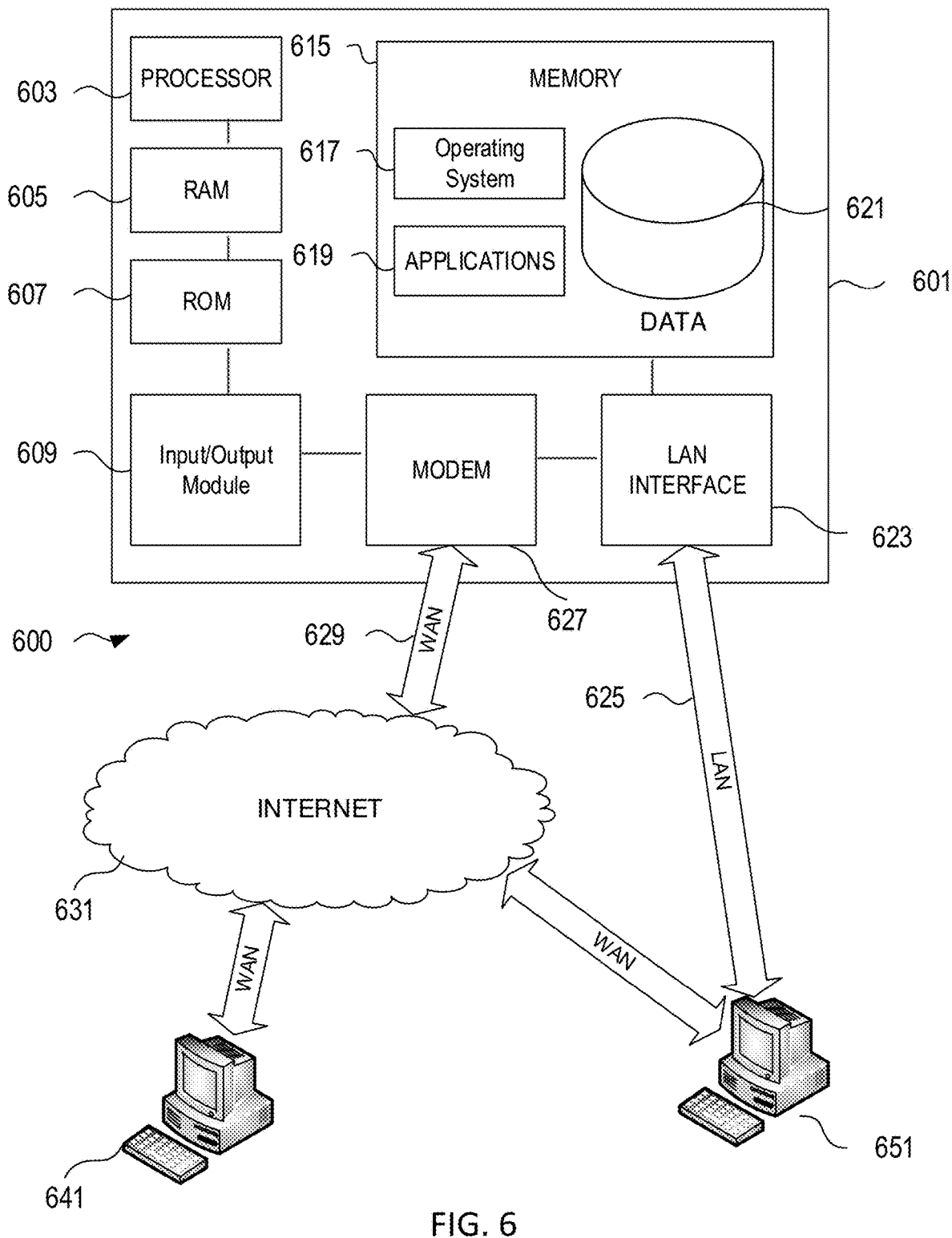
FIG. 6 shows an illustrative operating environment in which various aspects of the disclosure may be implemented, according to one or more aspects described herein.

As such, the machine learning training device 102, or one or more of the modules of the device 102 may be implemented as one or more network-linked computer devices, such as device 601 from FIG. 6. Thus, the machine learning training device 102 may be implemented on consolidated computing hardware, such as computing device 601, at a single geographic location, and/or on a single integrated circuit, and the like. In another example, the machine learning training device 102 may be implemented across multiple computing devices at a common, or dispersed geographic locations. In one example, the device 601 may be in communication with devices 641 and 651 using one or more networking technologies (625, 629, and/or 631) described in further detail in the description that follows.

In one example implementation, computing device 601 may have a processor 603 for controlling overall operation of device 601 and its associated components, including RAM 605, ROM 607, an input/output (I/O) module 609, and memory 615. In one example, as will be apparent to those of ordinary skill in the art, memory 615 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 615 may comprise a non-transitory computer-readable medium that may communicate instructions to processor 603 to be executed.

I/O module 609 may include a microphone, keypad, touch screen, and/or stylus through which a user of the computing device 601 may provide input, and may also include one or more of a speaker for providing audio output and a video display device for providing textual, audiovisual and/or graphical output. Software may be stored within memory 615 and/or storage to provide instructions to the processor 603 for allowing the computing device 601 to perform various functions. For example, memory 615 may store software used by the computing device 601, such as an operating system 617, application programs 619, and an associated database 621. The processor 603 and its associated components may allow the computing device 601 to run a series of computer-readable instructions to process and format data.

The computing device 601 may operate in a networked environment supporting connections to one or more remote computers, such as computing devices 641 and 651. In one example, the computing devices 641 and 651 may be personal computers or servers that include many, or all, of the elements described above relative to the computing device 601. Alternatively, computing device 641 and/or 651 may be a data store that is affected by the operation of the computing device 601. The network connections depicted in FIG. 6 include a local area network (LAN) 625 and a wide area network (WAN) 629, but may also include other networks. When used in a LAN networking environment, the computing device 601 is connected to the LAN 625 through a network interface or adapter 623. When used in a WAN networking environment, the computing device 601 may include a modem 627 or other means for establishing communications over the WAN 629, such as the Internet 631. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 619 used by the computing device 601 according to an illustrative embodiment of the disclosure may include computer-executable instructions for invoking functionality related to the machine learning training device 102. The computing device 601 and/or the other devices 641 or 651 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the machine learning training device 102 is able to execute algorithms to compare machine learning training requests and estimate energy that would be saved by grouping two or more of the requests together. Advantageously, the machine learning training device 102 may be used to reduce the carbon footprint associated with extensive machine learning operations that utilize arrays/clusters of GPUs. Further, the machine learning training device 102 processes high volumes of information and executes complex comparison algorithms and evaluations of different combinations of clustered training requests such that manual evaluation would not be possible, or would not be possible. For example, the machine learning training device 102 may process/evaluate hundreds or thousands of different combinations of consolidated training blocks in order to find a best available energy reduction. This type of high-frequency, complex assessment and prioritization functionality would not otherwise be possible without the algorithms executed by the machine learning training device 102.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a machine learning training device that has a queuing device configured to receive multiple machine learning training requests. The machine learning training device may also include a clustering device that is configured to consolidate two or more machine learning training requests selected from the multiple machine learning training requests received by the queuing device. This grouping/consolidation by the clustering device forms a consolidated training block. The clustering device may also include an isomorphism engine that is configured to execute a comparison process on the two or more machine learning training requests selected from the multiple training requests received by the queuing device. The clustering device may also include an energy estimator that is configured to calculate an estimate of an amount of energy saved by clustering the two or more machine learning training requests into the consolidated training block. The machine learning training device may also include a training engine that is configured to execute one or more machine learning processes or algorithms on the consolidated training block. The training engine may further calculate and output a set of shared model weights that are configured to be shared between the two or more machine learning training requests of the consolidated training block in order to predict the targets of the machine learning tasks. The machine learning training device may also include a notification engine that is configured to output a status of the training of the consolidated training block.

In one example, the clustering device of the machine learning training device may be configured to analyze attributes of a selected machine learning training request, selected from multiple training requests received and stored by the queuing device of the machine learning training device. This analysis may include identifying a data type of the selected machine learning training request, identifying a target type of the selected machine learning training request, and identifying architectural characteristics of/associated with the selected machine learning training request.

The clustering device may be further configured to consolidate two or more machine learning training requests into a consolidated training block based upon a priority and a data sensitivity of the two or more machine learning training requests.

A comparison process of the isomorphism engine may be a subgraph isomorphism process, and the isomorphism engine may be configured to output a compatibility score.

In one example, the compatibility score of the isomorphism engine may be configured to indicate whether two or more machine learning training requests compared by the isomorphism engine can be clustered into a consolidated training block.

The machine learning training device may further include a quantization engine that is configured to reduce the amount of memory used to store the shared model weights calculated by the training engine.

In one example, the energy estimator may be configured to estimate an amount of $CO_2$ saved by clustering two or more machine learning training requests into a consolidated training block.

The machine learning training device may also include a verification engine that is configured to validate an effectiveness of the clustering of the consolidated training block and configured to output a validation score to the clustering device.

The validation score of the clustering device may be used to iteratively improve a consolidation of two or more machine learning training requests into a consolidated training block.

The machine learning training device may include a processor, and a non-transitory computer-readable medium that has computer-executable instructions that, when executed by the processor, are configured to receive multiple machine learning training requests, and consolidate two or more of the received machine learning training requests into a consolidated training block. The computer-executable instructions, when executed, may also be configured to implement a comparison process between the two or more machine learning training requests, and estimate an amount of energy saved by clustering the two or more machine learning training requests into the consolidated training block. The computer executable instructions, when executed, may also be configured to execute one or more machine learning processes on the consolidated training block and output a set of shared model weights configured to be shared between the two or more machine learning training requests of the consolidated training block. The machine learning training device may also be configured to output a status of the training of the consolidated training block.

The computer-executable instructions, when executed by the processor, may also be configured to analyze attributes of a selected machine learning training request of the multiple machine learning training requests received. This analysis may include identifying a data type of the selected machine learning training requests, identifying a target type of the selected machine learning training requests, and identifying architectural characteristics of the machine learning training request.

The computer-executable instructions, when executed by the processor, may also be configured to consolidate the two or more machine learning training requests into the consolidated training block based upon a priority and a data sensitivity of the two or more machine learning training requests.

A comparison process used to generate a consolidated training block may include a subgraph isomorphism process that is configured to output a compatibility score.

The compatibility score of the subgraph isomorphism process may be configured to indicate whether two or more machine learning training requests can be clustered into the consolidated training block.

The computer-executable instructions, when executed by the processor, may be further configured to utilize discrete quantization to reduce an amount of memory used to store the shared model weights.

The computer-executable instructions, when executed by the processor, may be further configured to estimate an amount of $CO_2$ saved by clustering the two or more machine learning training requests into a consolidated training block.

The computer-executable instructions, when executed by the processor, may be further configured to validate an effectiveness of the clustering of the consolidated training block and output a validation score to the clustering device.

The validation score may be used to iteratively improve a consolidation of two or more machine learning training requests into a consolidated training block.

A method for reducing energy consumption for training machine learning models may include receiving multiple machine learning training requests, consolidating two or more machine learning training requests, selected from the received machine learning training requests, into a consolidated training block, and implementing a comparison process between the two or more machine learning training requests. The method may additionally include estimating an amount of energy saved by clustering the two or more machine learning training requests into the consolidated training block, and executing one or more machine learning processes on the consolidated training block and outputting a set of shared model weights configured to be shared between the two or more machine learning training requests of the consolidated training block. The method may additionally include outputting a status of the training of the consolidated training block.

The method may also include analyzing attributes of a selected machine learning training request of the multiple machine learning training requests received. This analysis may include identifying a data type of the selected machine learning training request, identifying a target type of the selected machine learning training requests, and identifying architectural characteristics of the selected machine learning training request.

Accordingly, it will be understood that the invention is not to be limited to the embodiments disclosed herein, but is to be understood from the following claims, which are to be interpreted as broadly as allowed under the law.

What is claimed is:

1. A machine learning training device having at least one processor and memory and comprising:
   a queuing device that receives a plurality of machine learning training requests, wherein each machine learning training request of the plurality of machine learning training requests includes a number of iterations used to complete training of a machine learning model;
   a clustering device that consolidates two or more machine learning training requests selected from the plurality of machine learning training requests received by the queuing device to generate a consolidated training block to be processed as a single machine learning training process, the clustering device further comprising:
      an isomorphism engine that implements a comparison process between the two or more machine learning training requests, wherein the comparison includes executing a subgraph isomorphism algorithm that compares formats, data types, and computer architecture formats of the two or more machine learning training requests to determine compatibility for consolidation;
      an energy estimator that calculates an estimate of an amount of energy saved by clustering the two or more machine learning training requests into the consolidated training block, wherein the amount of energy saved is based at least in part on a number of iterations associated with each machine learning training request, and wherein the clustering device consolidates the two or more machine learning training requests to generate the consolidated training block responsive to determining that the amount of energy saved by clustering the two or more machine learning training requests into the consolidated training block is greater than at least a threshold amount of energy savings; and
      a verification engine that generates feedback to iteratively improve subsequent consolidating of two or more machine learning training requests;
   a training engine, in communication with an array of graphics processing units, that executes one or more machine learning processes on the consolidated training block by distributing training of the machine learning model based on the consolidated training block across the array of graphics processing units and outputs a set of model weights converted from 32-bit floating-point data types to 16-bit floating-point data types as shared model weights configured to be shared between the two or more machine learning training requests of the consolidated training block; and
   a notification engine that outputs a status of the training of the machine learning model based on the consolidated training block.

2. The machine learning training device of claim 1, wherein the clustering device analyzes attributes of a selected machine learning training request of the plurality of machine learning training requests received and stored by the queuing device, including:
   identifying a data type of the selected machine learning training request;
   identifying a target type of the selected machine learning training request; and
   identifying architectural characteristics of the selected machine learning training request.

3. The machine learning training device of claim 1, wherein the clustering device consolidates the two or more machine learning training requests to generate the consolidated training block based upon a priority and a data sensitivity of the two or more machine learning training requests.

4. The machine learning training device of claim 1, wherein the isomorphism engine outputs a compatibility score.

5. The machine learning training device of claim 4, wherein the compatibility score is configured to indicate whether the two or more machine learning training requests can be clustered to generate the consolidated training block.

6. The machine learning training device of claim 1, further comprising a quantization engine that reduces an amount of memory used to store the shared model weights.

7. The machine learning training device of claim 1, wherein the energy estimator estimates an amount of carbon dioxide ($CO_2$) saved by clustering the two or more machine learning training requests to generate the consolidated training block.

8. The machine learning training device of claim 1, wherein the verification engine validates an effectiveness of the clustering of the consolidated training block and outputs a validation score to the clustering device.

9. A machine learning training device comprising:
   a processor;
   a non-transitory computer-readable medium comprising computer-executable instructions that, when executed by the processor, are configured to:
      receive a plurality of machine learning training requests, wherein each machine learning training request of the plurality of machine learning training requests includes a number of iterations used to complete training of a machine learning model;

execute, by an isomorphism engine, a subgraph isomorphism algorithm comparing formats, data types, and computer architecture formats of two or more machine learning training requests of the plurality of machine learning training requests to determine compatibility for consolidation;

estimate an amount of energy saved by consolidating the two or more machine learning training requests, wherein the amount of energy saved is based at least in part on a number of iterations associated with each machine learning training request;

determine that the amount of energy saved at least meets a threshold;

responsive to determining that the amount of energy saved at least meets the threshold, consolidate the two or more machine learning training requests to generate a consolidated training block;

generate, based on the consolidated two or more machine learning training requests, feedback;

iteratively update evaluation of subsequent consolidating of two or more machine learning training requests based on the feedback;

execute one or more machine learning processes on the consolidated training block by distributing training of the machine learning model based on the consolidated training block across an array of graphics processing units, and output a set of model weights converted from 32-bit floating-point data types to 16-bit floating-point data types as shared model weights configured to be shared between the two or more machine learning training requests of the consolidated training block; and output a status of the training of the machine learning model based on the consolidated training block.

10. The machine learning training device of claim 9, wherein the computer-executable instructions, when executed by the processor, are further configured to analyze attributes of a selected machine learning training request of the plurality of machine learning training requests, including:

identifying a data type of the selected machine learning training request;

identifying a target type of the selected machine learning training request; and identifying architectural characteristics of the selected machine learning training request.

11. The machine learning training device of claim 9, wherein the computer-executable instructions, when executed by the processor, are further configured to consolidate the two or more machine learning training requests to generate the consolidated training block based upon a priority and a data sensitivity of the two or more machine learning training requests.

12. The machine learning training device of claim 9, wherein the isomorphism engine outputs a compatibility score.

13. The machine learning training device of claim 12, wherein the compatibility score is configured to indicate whether the two or more machine learning training requests can be clustered to generate the consolidated training block.

14. The machine learning training device of claim 9, wherein the computer-executable instructions, when executed by the processor, are further configured to utilize discrete quantization to reduce an amount of memory used to store the shared model weights.

15. The machine learning training device of claim 9, wherein the computer-executable instructions, when executed by the processor, are further configured to estimate an amount of $CO_2$ saved by clustering the two or more machine learning training requests to generate the consolidated training block.

16. The machine learning training device of claim 9, wherein the computer-executable instructions, when executed by the processor, are further configured to output a validation score to a clustering device.

17. A method for reducing energy consumption for training machine learning models, comprising:

receiving a plurality of machine learning training requests, wherein each machine learning training request of the plurality of machine learning training requests includes a number of iterations used to complete training of a machine learning model;

executing, by an isomorphism engine, a subgraph isomorphism algorithm comparing formats, data types, and computer architecture formats of two or more machine learning training requests of the plurality of machine learning training requests to determine compatibility for consolidation;

estimating an amount of energy saved by consolidating the two or more machine learning training requests, wherein the amount of energy saved is based at least in part on a number of iterations associated with each machine learning training request;

determining that the amount of energy saved at least meets a threshold;

responsive to determining that the amount of energy saved at least meets the threshold, consolidating the two or more machine learning training requests to generate a consolidated training block;

generating, based on the consolidated two or more machine learning training requests, feedback;

iteratively updating evaluation of subsequent consolidating of two or more machine learning training requests based on the feedback;

executing one or more machine learning processes on the consolidated training block by distributing training of the machine learning model based on the consolidated training block across an array of graphics processing units, and outputting a set of model weights converted from 32-bit floating-point data types to 16-bit floating-point data types as shared model weights configured to be shared between the two or more machine learning training requests of the consolidated training block; and outputting a status of the training of the machine learning model based on the consolidated training block.

18. The method of claim 17, further comprising:

analyzing attributes of a selected machine learning training request of the plurality of machine learning training requests, including:

identifying a data type of the selected machine learning training request;

identifying a target type of the selected machine learning training request; and identifying architectural characteristics of the selected machine learning training request.

\* \* \* \* \*